(12) United States Patent
Kaijala et al.

(10) Patent No.: US 6,903,286 B2
(45) Date of Patent: Jun. 7, 2005

(54) TENSION SENSING DEVICE

(75) Inventors: Murray Kaijala, Elkhart, IN (US); Patrick B. Blakesley, Goshen, IN (US); Dale Teeters, South Bend, IN (US)

(73) Assignee: CTS Corporation, Elkhart, IN (US)

( * ) Notice: Subject to any disclaimer, the term of this patent is extended or adjusted under 35 U.S.C. 154(b) by 112 days.

(21) Appl. No.: 10/608,505

(22) Filed: Jun. 27, 2003

(65) Prior Publication Data

US 2004/0262136 A1 Dec. 30, 2004

Related U.S. Application Data

(60) Provisional application No. 60/482,541, filed on Jun. 25, 2003.

(51) Int. Cl.[7] ............................................. H01H 35/36
(52) U.S. Cl. ................ 200/85 A; 200/85 R; 340/686.1; 73/862.451
(58) Field of Search ......................... 200/52 R, 61.45 R, 200/61.46, 61.58 B, 85 R, 85 A, 330; 73/862.451, 862.471; 340/686.1–686.4, 644

(56) References Cited

U.S. PATENT DOCUMENTS

| | | | | |
|---|---|---|---|---|
| 4,361,741 A | * | 11/1982 | Leskoverc et al. | ......... 200/85 A |
| 4,385,863 A | * | 5/1983 | Minor | ......................... 414/699 |
| 4,943,087 A | | 7/1990 | Sasaki | |
| 5,026,093 A | | 6/1991 | Nishikaji | |
| 5,044,459 A | | 9/1991 | Nishikaji | |
| 5,060,977 A | | 10/1991 | Saito | |
| 5,181,739 A | | 1/1993 | Bauer | |
| 5,244,231 A | | 9/1993 | Bauer | |
| 5,481,078 A | * | 1/1996 | Asche | ......................... 200/85 A |
| 5,720,523 A | * | 2/1998 | Kawabata et al. | .......... 297/338 |
| 5,765,774 A | | 6/1998 | Maekawa | |
| 5,960,523 A | | 10/1999 | Husby | |
| 5,965,827 A | | 10/1999 | Stanley | |
| 5,996,421 A | | 12/1999 | Husby | |
| 6,081,759 A | | 6/2000 | Husby | |
| 6,151,540 A | | 11/2000 | Anishetty | |
| 6,161,439 A | | 12/2000 | Stanley | |
| 6,205,868 B1 | | 3/2001 | Miller | |
| 6,209,915 B1 | | 4/2001 | Blakesley | |
| 6,230,088 B1 | | 5/2001 | Husby | |
| 6,264,236 B1 | | 7/2001 | Aoki | |
| 6,264,281 B1 | | 7/2001 | Dukatz | |
| 6,301,977 B1 | | 10/2001 | Stojanovski | |
| 6,336,371 B1 | | 1/2002 | O'Boyle | |
| 6,356,200 B1 | * | 3/2002 | Hamada et al. | ............. 340/667 |
| 6,359,245 B1 | * | 3/2002 | Wahls | ....................... 200/52 R |
| 6,363,793 B2 | | 4/2002 | O'Boyle | |
| 6,364,352 B1 | | 4/2002 | Norton | |
| 6,400,145 B1 | | 6/2002 | Chamings | |
| 6,448,512 B1 | * | 9/2002 | Cooper | ....................... 177/144 |
| 6,450,534 B1 | | 9/2002 | Blakesley | |
| 6,520,540 B1 | | 2/2003 | Siegfried et al. | |
| 6,522,257 B1 | | 2/2003 | Jakob et al. | |

* cited by examiner

Primary Examiner—Richard K. Lee
(74) Attorney, Agent, or Firm—Mark P. Bourgeois

(57) ABSTRACT

The present invention is a child seat detecting apparatus for detecting the presence of a child seat in a vehicle. The child seat detecting apparatus is a tension sensing device that is attached to a vehicle seat. The tension sensing device includes a bracket that is mounted to the vehicle seat. A moveable bar is retained by the bracket. The moveable bar is attached to the child seat. A sensor is mounted between the bracket and the moveable bar. The sensor is adapted to provide an electrical signal that is indicative of a magnitude of tension on the moveable bar. A spring is located between the bracket and the moveable bar. The spring biases the moveable bar away from the bracket.

23 Claims, 5 Drawing Sheets

TENSION SENSING DEVICE

This application claims benefit of provisional application Ser. No. 60/482,541 filed Jun. 25, 2003.

BACKGROUND

1. Field of the Invention

This invention relates to a child seat detecting apparatus, and more particularly to a tension sensing device for detecting a child seat mounted on a vehicle seat.

2. Description of the Related Art

Air bags have been heralded for their ability to reduce injuries and save lives. However, since their incorporation into automobiles, a problem has existed with airbags deploying when children are seated in a vehicle. In particular, young children in child seats are especially susceptible to injury during airbag deployment. Air bags are designed to cushion the impact of occupants and thus reduce the injuries suffered. However, the force needed to properly cushion an adult can cause injuries in children.

When a child seat is mounted on the passenger seat and an air bag deploys during a collision, the child seat is impacted by the air bag such that the child seated in the child seat receives the impact. It is desirable to have the airbag automatically switch off and not activate during a collision when a child seat is present.

Child seats are constructed so as to be secured to the vehicle seat. Newer vehicles use a pair of child seat latches or anchor bars to attach the child seat to the vehicle seat. The latches or anchor bars are mounted to the frame of the seat which in turn is bolted to the floor of the vehicle. The child seat is attached to the anchor bar by either a mini-belt and buckle or by a locking hook. Both of these attachment devices are tightened by the user during installation, such that they pull or place a tension on the anchor bar. The child seat is therefore cinched down to the vehicle seat by the mini-belt and buckle or by a locking hook.

A current unmet need exists for a sensor to detect the tension on a child seat anchor bar in order to determine the presence or absence of a child seat in a vehicle.

SUMMARY

It is a feature of the present invention to provide a child seat detecting apparatus.

Another feature of the invention is to provide a tension sensing device for attachment to a seat that includes a bracket that is adapted to be secured to the seat. A moveable bar is retained by the bracket. A sensor is mounted between the bracket and the moveable bar. The sensor is adapted to provide an electrical signal that is indicative of a magnitude of tension on the moveable bar. A spring is located between the bracket and the moveable bar. The spring biases the moveable bar away from the bracket.

Figure 1:
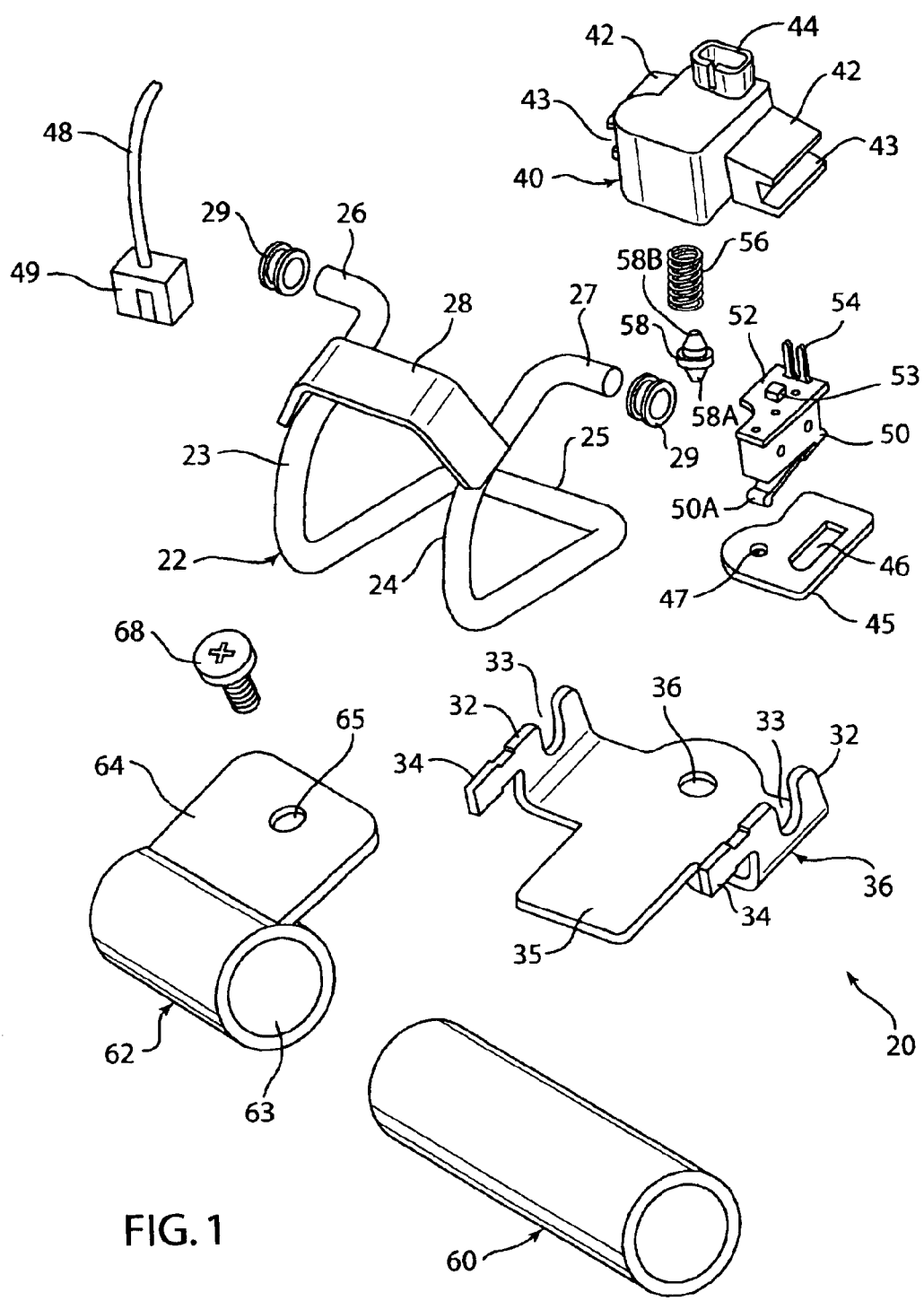
FIG. 1 is a perspective exploded view of the preferred embodiment of a tension sensing device.
Figure 2:
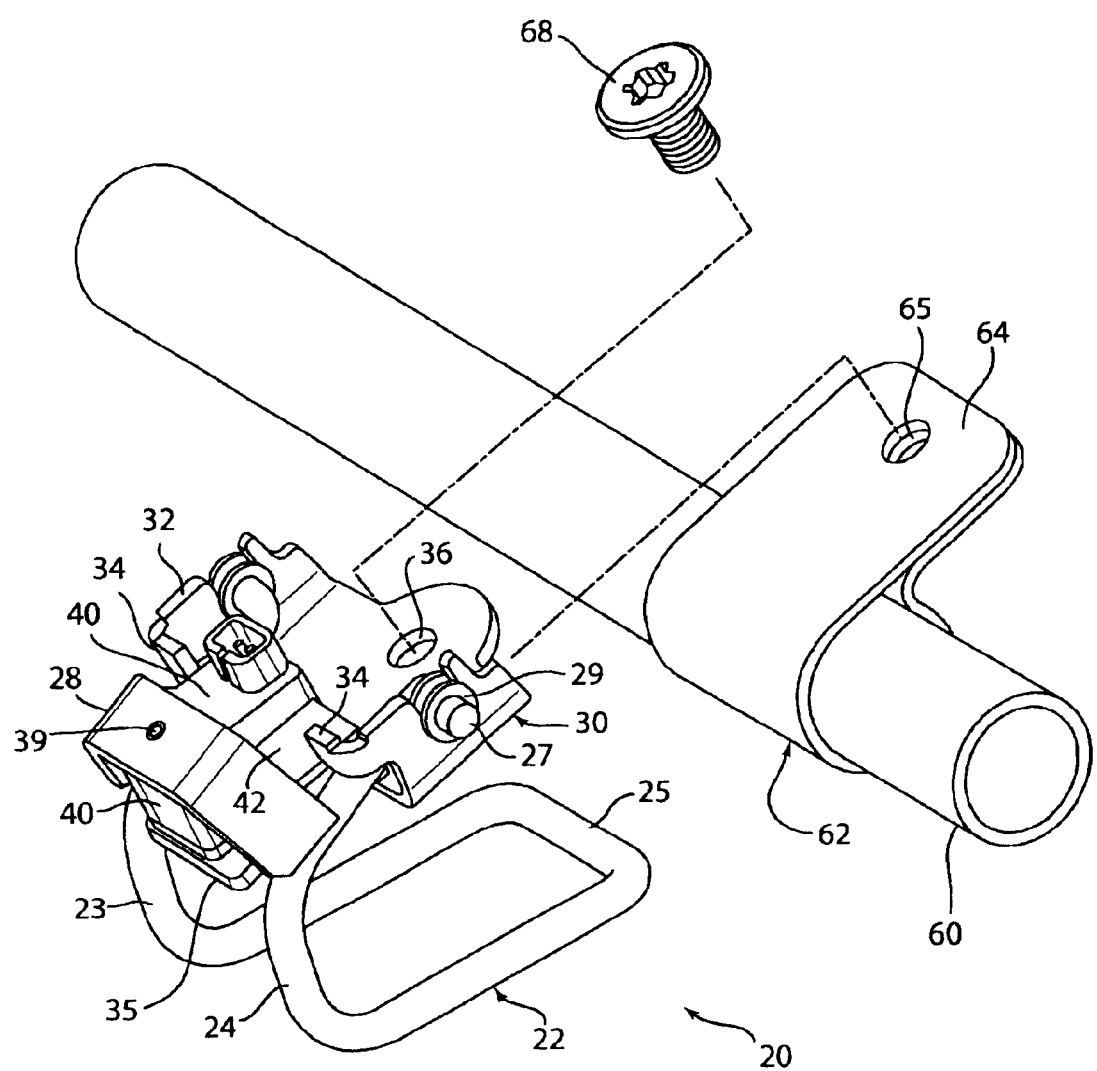
FIG. 2 is an assembled view of FIG. 1 showing the tension sensing device ready to mount to a seat member.
Figure 3:
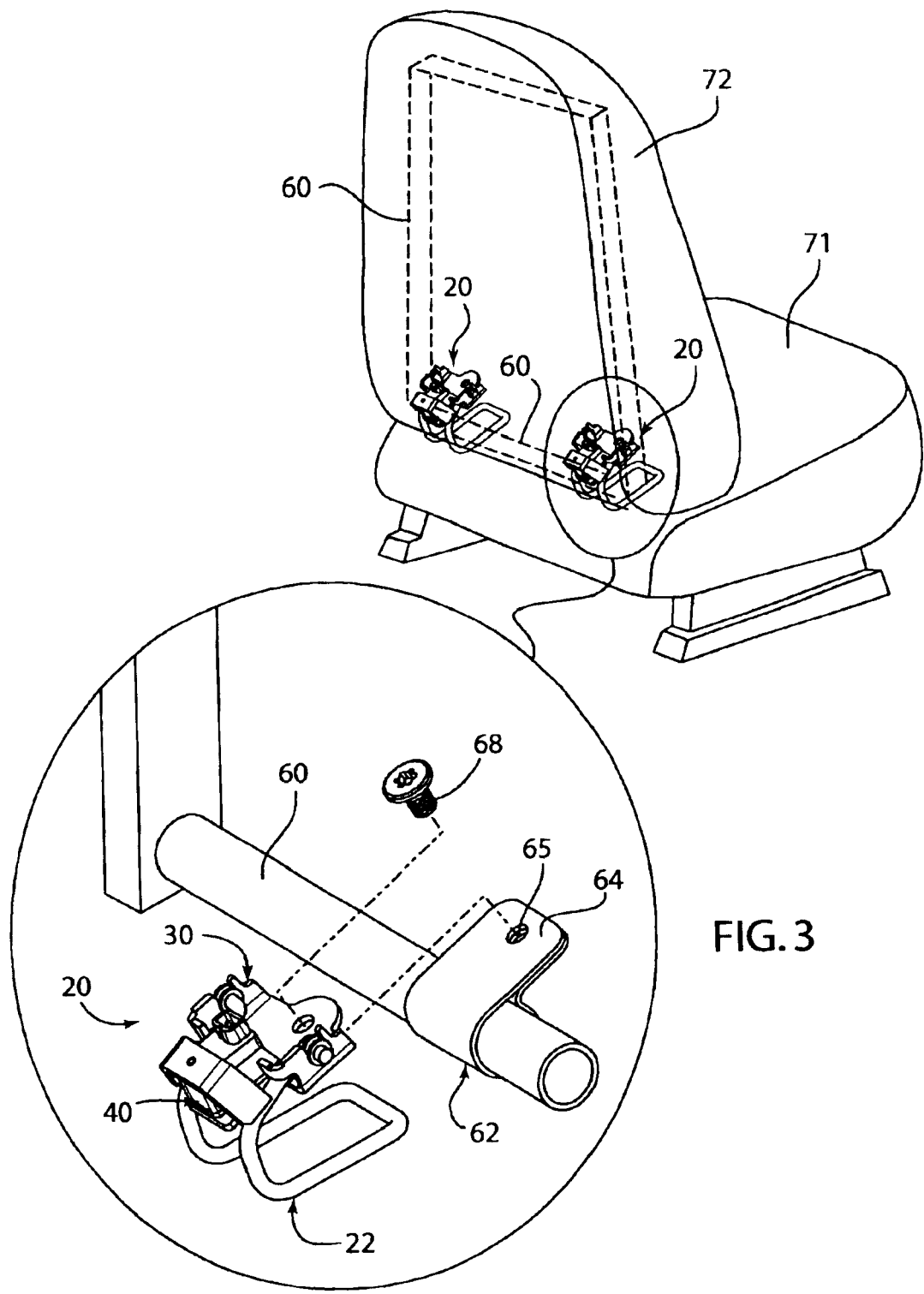
FIG. 3 is a perspective view of a seat showing the mounting of the tension sensing device.

It is noted that the drawings of the invention are not to scale.

DETAILED DESCRIPTION

Referring to FIGS. 1–5 there is a tension sensing device 20 shown. Tension sensing device 20 has a moveable anchor bar 22 that is mounted to a bracket 30. Anchor bar 22 has a pair of spaced arms 23 and 24, a U-shaped end 25 and a pair of ends 26 and 27. Anchor bar 22 also has a cross-member 28 with a hole 31. A pair of polymer bushings 29 are mounted over ends 26 and 27. Bracket 30 has a pair of uprights 32 with notches 33 and ears 34. Bracket 30 also has a bottom plate 35 with a hole 36.

Bracket 30 supports and retains anchor bar 22. Ends 26 and 27 with bushings 29 rest in notches 33. The bushings 29 allow anchor bar 22 to pivot or rotate with respect to bracket 30. The axis of rotation or pivot point is labeled P in FIG. 4. Ears 34 are bent over arms 23 and 24 after assembly to retain anchor bar 22 to bracket 30. Bracket 30 and bar 22 are formed from 1018 steel.

A housing 40 is mounted between cross-member 28 and bottom plate 35. Housing 40 has a pair of projections 42 on opposite sides and a connector shroud 44. Each projection 42 has a groove 43. Grooves 43 slide over arms 23 and 24 during assembly and hold the housing 40 to anchor bar 22. Housing 40 has a pair of cavities 41A and 41B. A cover 45 seals housing 40. Housing 40 and cover 45 are formed from plastic. Cover 45 has a slot 46 and a hole 47.

A sensor 50 is mounted inside cavity 41A. Sensor 50 can be one of several devices. For example, sensor 50 can be a switch, a hall effect sensor, a variable resistor or a pressure sensor. Sensor 50 preferably is a switch and more preferably is a micro-switch. For convenience, sensor 50 will now be referred to as switch 50. The switch can be either a normally open or normally closed switch. Switch 50 has an arm 50A that extends through slot 46 after assembly and is in contact with bottom plate 35. Switch 50 is mounted to a printed circuit board 52 and is connected to printed circuit lines (not shown) on board 52. Electronic components 53 such as transistors or resistors may be mounted to the printed circuit board if it is desired to condition the electrical output of switch 50. Terminals 54 are mounted to printed circuit board 52 and connect with the printed circuit lines on board 52. A connector 49 mounts to connector shroud 44. Wire harness 48 is electrically connected through connector 49 to terminals 54. Wire harness 48 provides power to switch 50. Wire harness 48 would be connected to another electrical circuit such as an airbag controller so that the output signal from switch 50 can be used to control deployment of an airbag.

A spring 56 and actuator 58 are mounted in cavity 41. Actuator 58 has an end 58A that extends through hole 47 and another end 58B that rests in the end of spring 56. The other end of spring 56 is in contact with a threaded adjustment screw 39 that is mounted to housing 40. Cover 45 is heat staked to join it with housing 40. Spring 56 is preloaded to about 10 pounds by the compression of cover 45. Adjustment screw 39 is used to adjust the spring preload and therefore to adjust the switch point tension. Actuator end 58A passes through hole 47 and rests against bottom plate 35.

Vehicle seat 70 has a seat bottom 71 and a seat back 72. A child seat 74 is shown mounted in seat 70. Child seat 74 is connected to anchor bar 22 by a latch hook or mini belt 76. The latch hook or mini belt 76 has a mechanism to allow tightening of the child seat 74 to vehicle seat 70. Tension sensing device 20 is shown mounted to a part of the vehicle seat frame called a seat member 60. The seat frame is made from steel. A support 62 is welded to seat member 60. Support 62 has a bore 63 and a tongue 64. Tongue 64 has a threaded hole 65.

Tension sensing device 20 is shown mounted to support tube 62. Tension sensing device 20 is mounted above seat member 60 and extends into seat back 72. Anchor bar 22 wraps around support 62. Bracket 30 is mounted to support 62. Bracket 30 rests on tongue 64. Threaded fastener 68 passes through hole 36 and mates with the threads in hole 65.

Assembly

The present invention would be assembled as follows:
1. Terminals 54, switch 50 and electronic component 53 are mounted to printed circuit board 52.
2. Printed circuit board 52 is placed in cavity 41A, adjustment screw 39, spring 56 and actuator 58 are placed in cavity 41B.
3. Cover 45 is placed over housing 40 and either heat staked or fastened in place with screws.
4. Housing 40 is mounted to anchor bar 22 by sliding grooves 43 onto arms 23 and 24.
5. Bushings 29 are placed onto ends 26 and 27.
6. Anchor bar 22 is placed onto bracket 30 with bushings 29 being pressed into notches 33.
7. Ears 34 are bent over arms 23, 24 and projections 42 to retain the anchor bar to the bracket.
8. Support 62 is slipped over seat member 60 and welded in place during manufacturing of the seat.
9. Tension sensing device 20 is placed onto tongue 64 and attached using fastener 68.
10. Connector 49 is mated onto connector shroud 44.

Operation

Figure 4:
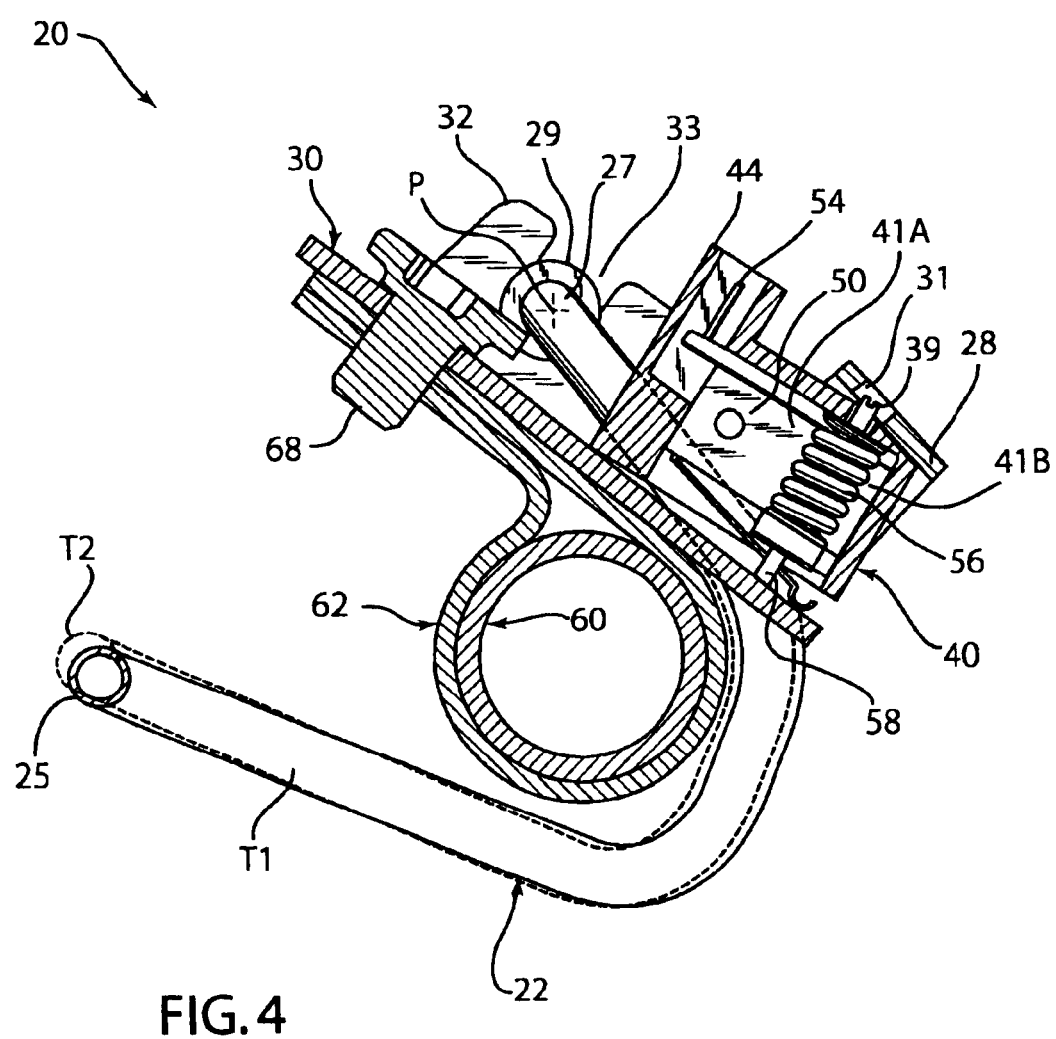
FIG. 4 is a side cross sectional view of the tension sensing device of FIG. 2 mounted to the seat member.

When a tension or pulling force is applied to anchor bar 22 by latch hook 76, the anchor bar rotates about pivot point P. The starting or no tension position is shown in FIG. 4. In FIG. 4, the anchor bar 22 is shown with a solid line at position T1 with no applied tension. As the anchor bar 22 rotates, cross member 28 presses downwardly on the top of housing 40 causing spring 56 to start to be compressed. As more tension is applied to the anchor bar 22, spring 56 will be further compressed and arm 50A will start to be depressed. As more tension is applied to the anchor bar 22, spring 56 will be further compressed and arm 50A will cause switch 50 to move from an open state to a closed state allowing or altering an electrical current to flow between terminals 54. As further tension is applied to the anchor bar 22, spring 56 will be further compressed and the bottom of housing 40 will contact bottom plate 35 at which point depression of arm 50A ceases. The anchor bar is shown as dotted at this position T2 in FIG. 4. It is noted that the switch will change states prior to the housing 40 bottoming on plate 35.

In a high load situation, such as a sudden stop or as a result of the child seat being pulled or cinched down, the force applied to the anchor bar 22 overcomes the force of spring 56. At this point, housing 40 moves to rest against bottom plate 35. Any additional force from latch hook 76 is then transferred to bracket 30, support tube 62 and seat member 60. Thus, the excessive or overload forces are transferred from the child seat to the vehicle. In this way, no further force is applied to switch 50 and it is thus protected from mechanical damage due to excessive loads. The overload tension position is shown in FIG. 4 as position T2. In FIG. 4, the anchor bar 22 is shown with a dotted line in the position with maximum tension.

If a further load is applied from position T2, the anchor bar 22 can bend to contact support 62 as an additional stop.

Remarks

The tension sensing device of the present invention has several advantages. It provides for detection of a child seat in a vehicle and can be connected with an airbag controller so that the airbag controller can use the child seat information to determine if an airbag is to be deployed. The tension sensing device allows accurate sensing of the presence of a child seat at low cost. The tension sensing device allows accurate sensing of low tensile forces, while at the same time protecting the switch or sensor from excessive loads that could damage the switch or sensor.

The present invention allows an airbag controller to make better decisions as to when and how to deploy an airbag based upon more accurate vehicle seat occupant information. In the case of a child's car seat being strapped into a car seat, the tension sensing device allows the airbag controller to properly compute that the seat occupant is a child and to prevent deployment of the airbag.

The tension sensing device of the present invention is readily mounted to existing vehicle seat frames without extensive modification. Thus, safety engineers can easily incorporate and install the tension sensing device into present and future vehicle designs.

Figure 5:
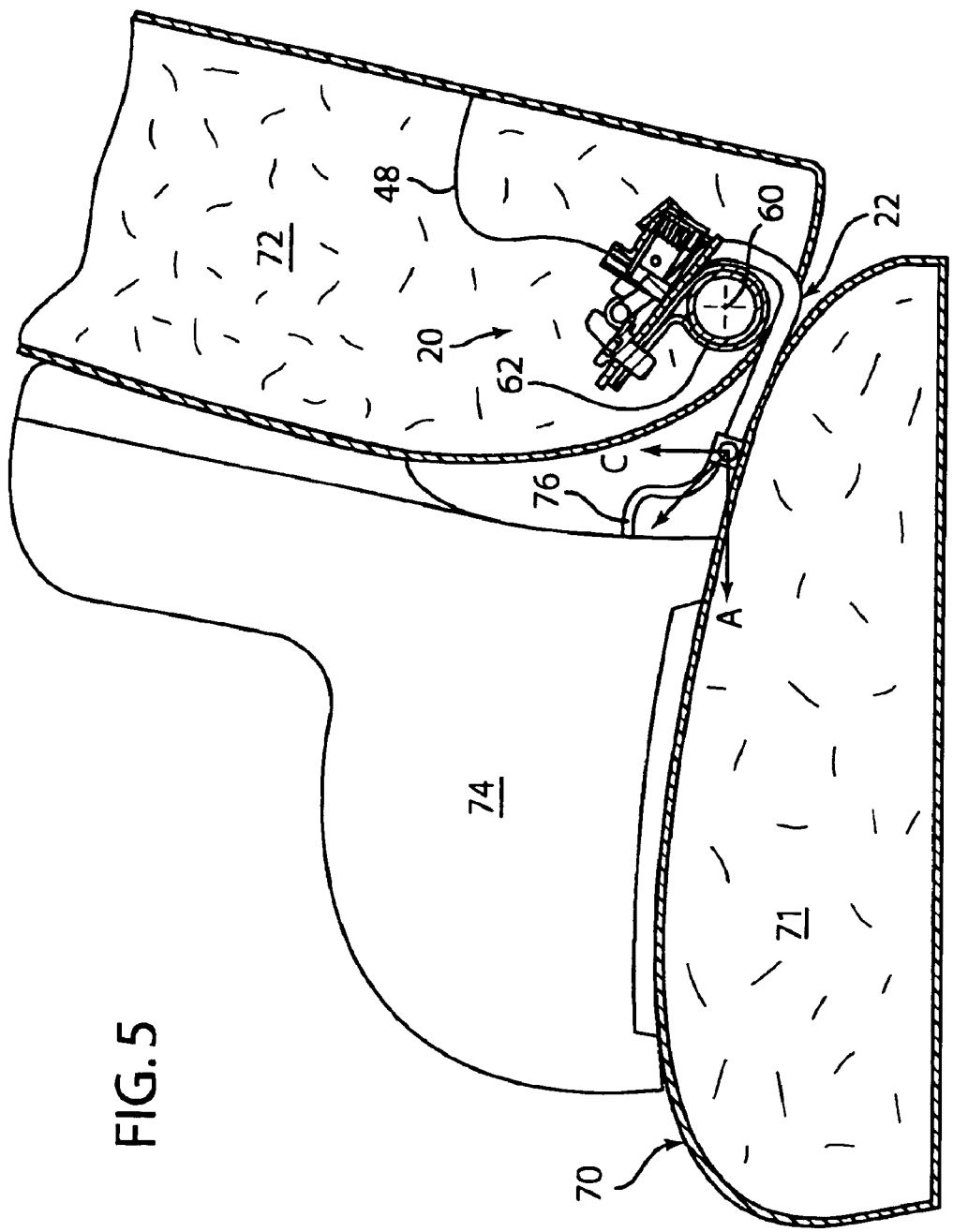
FIG. 5 is a side cross sectional view of the tension sensing device of FIG. 2 mounted in a seat.

Another advantage of the present invention is that it can accurately sense tension over a wide range of applied tension directions or tension vectors. Referring to FIG. 5, three different applied tension directions are shown, A, B and C. Because there are dozens of child seat manufacturers, each with their own design, the resulting tension vector can end up being applied from many different directions or angles. Because tension sensing device 20 has anchor bar 22 that rotates about point P, the actuation of switch 20 is substantially independent of the direction of applied tension. Switch 20 will actuate with nearly equal force if the direction of tension is applied along vector A, B or C or anywhere in between. The angle between vectors A and C can be up to 135 degrees and still maintain accurate sensing.

If the present invention was only to actuate at a given tension magnitude with a straight line tension, (for example along vector C), then if the same magnitude of tension was placed along vectors A and C, the switch would not be actuated as only a fraction of the tension magnitude would be applied to the switch. The present invention overcomes this potential problem by allowing the tension to be applied over a fairly wide range of angles while still accurately sensing tension.

Variations of the Invention

The sensor 50 shown was a switch. One skilled in the art will realize that the preferred embodiment would work with other types of sensors. For example, sensor 50 could be a hall effect sensor, a variable resistor, a pressure sensor or a reed switch.

Another variation of the tension sensing device would be to utilize other mounting structures or locations. For example, seat support 62 could be eliminated and bracket 30 welded to seat member 60. Alternatively, tension sensing device 20 could be attached to the floor of the vehicle or to another location within the seat.

While the tension sensor was shown with an anchor bar 22, other shapes of structures that would allow mounting to a child seat and rotation about point P could be used. For example, one half of anchor bar 22 could be used resulting in a C-shaped anchor bar.

The tension sensing device was used to detect a child seat. One skilled in the art will realize that the preferred embodiment could be used to detect other tensile forces at other locations. For example, tension sensing device 20 could be attached to a seat belt in a vehicle to detect seat belt tension.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A tension sensing device comprising:
    a bracket adapted to be connected to a seat, the bracket having a pair of notches;
    a moveable bar retained by the bracket, the moveable bar having a pair of spaced apart arms that are retained in the notches, the notches supporting the arms such that the moveable bar can be rotated relative to the bracket;
    a sensor mounted between the bracket and the moveable bar, the sensor adapted to provide an electrical signal that is indicative of a magnitude of tension on the moveable bar; and
    a spring located between the bracket and the moveable bar, the spring biasing the moveable bar away from the bracket.

2. The tension sensing device according to claim 1 further comprising:
    a housing mounted between the bracket and the moveable bar.

3. The tension sensing device according to claim 2, wherein the sensor is a switch.

4. The tension sensing device according to claim 3, wherein the switch is mounted between the housing and the bracket, the moveable bar operable to close and open the switch.

5. The tension sensing device according to claim 4, wherein the housing is adapted to engage the bracket to provide overload protection for the switch.

6. The tension sensing device according to claim 1, wherein the arms each have an end, the ends of the arms being retained in the notches, the notches supporting the ends of the arms such that the bar can be rotated relative to the bracket.

7. The tension sensing device according to claim 6, wherein a housing has a pair of grooves, the grooves adapted to engage the arms such that the housing is retained by the arms.

8. The tension sensing device according to claim 6, wherein the moveable bar has a cross member extending between the arms.

9. The tension sensing device according to claim 1, wherein a wire harness is connected to the sensor.

10. A tension sensing device for attachment to a seat member, comprising:
    a bracket adapted to be secured to the seat member;
    a bar retained by the bracket, the bar having a cross member and being rotatable with respect to the bracket;
    a spring located between the bracket and the cross member, the spring biasing the bar away from the bracket; and
    a switch mounted between the bracket and the bar, the bar moving to actuate the switch when tension above a first magnitude is applied to the bar.

11. The tension sensing device according to claim 10, wherein the switch is open when tension less than the first magnitude is applied to the bar.

12. The tension sensing device according to claim 10, wherein the bar wraps around the seat member.

13. The tension sensing device according to claim 10, wherein a housing is mounted between the bracket and the bar.

14. The tension sensing device according to claim 13, wherein the switch is mounted to the housing.

15. The tension sensing device according to claim 14, wherein the housing is adapted to engage the bracket to provide overload protection for the switch.

16. A tension sensing device for attachment to a seat member, comprising:
    a bracket that is attachable to the seat member;
    an anchor bar retained by the bracket, the bar being moveable with respect to the bracket when tension is placed on the bar;
    a coil spring located between the bracket and the bar, the coil spring biasing the bar away from the bracket;
    a switch mounted between the bracket and the bar; and
    the anchor bar moveable between a first and second position such that the switch is actuated.

17. The tension sensing device according to claim 16, wherein when the anchor bar is in the second position overload protection for the switch is provided.

18. The tension sensing device according to claim 16, wherein the anchor bar is connectable with a child seat.

19. The tension sensing device according to claim 18, wherein the switch is operable to detect the presence or absence of the child seat.

20. A tension sensing devise comprising:
    a bracket adapted to be secured to a seat;
    an anchor bar having a pair of ends, the ends being pivotally retained by the bracket, the anchor bar connectable with an object that provides tension on the anchor bar;
    a sensor mounted between the bracket and the anchor bar, the sensor being actuated by the pivoting anchor bar, the sensor adapted to indicate a magnitude of tension on the anchor bar; and
    a spring located between the bracket and the anchor bar; the spring biasing the anchor bar away from the bracket.

21. The tension sensing device according to claim 20, wherein the sensor detects the magnitude of tension that is greater than a first pre-defined magnitude, the spring determining the first pre-defined magnitude.

22. The tension sensing device according to claim 20, wherein the sensor is selected from the group consisting of:
    a) switches;
    b) hall effect devices;
    c) pressure sensors; and
    d) variable resistors.

23. The tension sensing device according to claim 20, wherein the sensor is mounted in a housing.

* * * * *